(12) United States Patent
Washio

(10) Patent No.: US 7,345,791 B2
(45) Date of Patent: Mar. 18, 2008

(54) IMAGE PROCESSING DEVICE AND IMAGE PROCESSING METHOD

(75) Inventor: Koji Washio, Hachioji (JP)

(73) Assignee: Konica Corporation, Tokyo (JP)

( * ) Notice: Subject to any disclaimer, the term of this patent is extended or adjusted under 35 U.S.C. 154(b) by 943 days.

(21) Appl. No.: 10/357,872

(22) Filed: Feb. 4, 2003

(65) Prior Publication Data

US 2003/0151774 A1  Aug. 14, 2003

(30) Foreign Application Priority Data

Feb. 13, 2002  (JP) .............................. 2002-035192
Mar. 13, 2002  (JP) .............................. 2002-068499

(51) Int. Cl.
  *H04N 1/40*  (2006.01)
  *B41J 2/355*  (2006.01)

(52) U.S. Cl. .................... 358/3.13; 358/3.23; 358/3.26; 358/3.06; 358/501; 358/1.9; 358/2.1; 358/535; 358/534; 358/465; 347/131; 347/184; 399/181

(58) Field of Classification Search ............... 358/2.99, 358/3.01, 3.13, 3.21, 3.22, 465, 3.24, 3.26, 358/466, 3.23, 3.2, 1.9, 2.1, 535, 534, 3.06, 358/501; 382/251, 176; 347/131, 184; 399/180, 399/181
See application file for complete search history.

(56) References Cited

U.S. PATENT DOCUMENTS 5,488,385 A  *  1/1996  Singhal et al. ................ 345/3.1
5,566,111 A  * 10/1996  Choi ....................... 365/185.22
5,633,729 A  *  5/1997  Smith et al. .................. 382/251
5,691,828 A  * 11/1997  Weiss et al. ................... 358/534
5,805,724 A  *  9/1998  Metcalfe et al. .............. 382/176

(Continued)

FOREIGN PATENT DOCUMENTS

JP      63-125064 A    5/1988
JP       6-90350 A    3/1994

*Primary Examiner*—King Y. Poon
*Assistant Examiner*—S. Kau
(74) *Attorney, Agent, or Firm*—Frishauf, Holtz, Goodman & Chick, P.C.

(57) ABSTRACT

An image processing device for processing an input image so as to reproduce a halftone, includes: a matrix setting section for setting a threshold matrix having a plurality of elements arranged in M columns×N rows, at least two threshold values being stored in each of the elements; an element specifying section for specifying a corresponding element of the threshold matrix in accordance with a position of a pixel in the input image; and a multilevel signal generating section for fetching the threshold values from the specified element and for generating a multilevel signal by transforming an input pixel value to one of multiple levels in accordance with the fetched threshold values; wherein the multilevel signal generating section outputs a constant value Doutmin as the multilevel signal when a first condition that the input pixel value is smaller than or not larger than a minimum value of the threshold values, is satisfied; the multilevel signal generating section outputs a constant value Doutmax when a second condition that the input pixel value is larger than or not smaller than a maximum value of the threshold values, is satisfied; and the multilevel signal generating section outputs an interpolation value between the two constant values Doutmin and Doutmax by carrying out a predetermined operation when both of the first condition and the second condition are not satisfied.

12 Claims, 16 Drawing Sheets

U.S. PATENT DOCUMENTS 5,875,268 A * 2/1999 Miyake ................ 382/276
5,982,508 A * 11/1999 Kashihara ............ 358/3.08
6,714,320 B1 * 3/2004 Nakahara et al. ......... 358/3.13
6,930,800 B1 * 8/2005 Adachi et al. ........... 358/3.13

* cited by examiner

FIG.2A

| LL(12) UL(12) | LL(13) UL(13) | LL(14) UL(14) | LL(15) UL(15) |
|---|---|---|---|
| LL(8) UL(8) | LL(9) UL(9) | LL(10) UL(10) | LL(11) UL(11) |
| LL(4) UL(4) | LL(5) UL(5) | LL(6) UL(6) | LL(7) UL(7) |
| LL(0) UL(0) | LL(1) UL(1) | LL(2) UL(2) | LL(3) UL(3) |

FIG.2B

| F12 (Din) | F13 (Din) | F14 (Din) | F15 (Din) |
|---|---|---|---|
| F8 (Din) | F9 (Din) | F10 (Din) | F11 (Din) |
| F4 (Din) | F5 (Din) | F6 (Din) | F7 (Din) |
| F0 (Din) | F1 (Din) | F2 (Din) | F3 (Din) |

FIG.2C

| 12 | 13 | 14 | 15 |
|---|---|---|---|
| 8 | 9 | 10 | 11 |
| 4 | 5 | 6 | 7 |
| 0 | 1 | 2 | 3 | saj ↑ sai →

FIG.11

MULTILEVEL SIGNAL Dout

| 100% | 50% | 0% | 100% | 50% | 0% | 50% |
| --- | --- | --- | --- | --- | --- | --- |
| 50% | 100% | 50% | 50% | 0% | 50% | 0% |
| 0% | 50% | 100% | 0% | 50% | 100% | 50% |
| 50% | 0% | 50% | 50% | 100% | 50% | 100% |

FIG.12

DOT SHIFT SIGNAL SX

| CENTER | ←LEFT | CENTER | RIGHT→ | CENTER | ←LEFT | CENTER | RIGHT→ |
|---|---|---|---|---|---|---|---|
| RIGHT→ | CENTER | ←LEFT | CENTER | RIGHT→ | CENTER | ←LEFT | CENTER |
| CENTER | RIGHT→ | CENTER | ←LEFT | CENTER | RIGHT→ | CENTER | ←LEFT |
| ←LEFT | CENTER | RIGHT→ | CENTER | ←LEFT | CENTER | RIGHT→ | CENTER |

PULSE SIGNAL WITHOUT DOT SHIFT SIGNAL

PULSE SIGNAL WITH DOT SHIFT SIGNAL

*FIG.16*

M X N MATRIX

| 12 | 13 | 14 | 15 |
|----|----|----|----|
| 8  | 9  | 10 | 11 |
| 4  | 5  | 6  | 7  |
| 0  | 1  | 2  | 3  | saj ↑ sai →

IMAGE PROCESSING DEVICE AND IMAGE PROCESSING METHOD

BACKGROUND OF THE INVENTION

1. Field of the Invention

The present invention relates to an image processing device and an image processing method. In particular, the present invention relates to an image processing device and an image processing method for preparing an image data for reproducing a halftone.

2. Description of Related Art

According to an earlier development, as a method for carrying out a halftone process for an image data having a brightness value, a density value or the like for each pixel unit, a dither method using a comparing operation for comparing the image data with a threshold matrix, has been used. As a so-called multilevel dither method in which a halftone process is carried out by outputting three or more multiple levels as output values, the method in which the above-described comparing operation are carried out a plurality of times, has been used.

According to the above-described method, in order to transform an input image data ton multiple levels, the comparing operation should be carried out n−1 times. For example, in order to transform the data to one of 64 multiple levels, it is required to carry out the comparing operation 63 times. Further, sixty-three threshold matrixes and sixty-three output values are required. Therefore, a memory area for storing these values is required. In case that a hardware for such a method is provided, the scale of the circuit becomes larger as the number of the output values increases. There was a problem that the cost thereof was increased.

On the other hand, the multilevel dither method in which an input image data is transformed to one of the multiple levels without using the comparing operation for comparing the input image data with the threshold value, is disclosed in, for example, Japanese Patent Application Publications No. Tokukai-Sho 63-125064 and No. Tokukai-Hei 6-90350.

In this method, the result of the calculation, such as the comparing operation for comparing the image data with the threshold matrix and the like, is previously obtained to store the result of the calculation as a lookup table in the circuit. The input image data is inputted to the lookup table pixel by pixel to extract the corresponding result of the calculation. By outputting the result, the image data is transformed to one of the multiple levels. According to this method, because all of the results of the calculation are stored in a memory and a comparing operation circuit is not required, there is an advantageous merit that the multiple levels or the dot patterns of the output image can be freely changed by only rewriting the results of the calculation without changing the circuit arrangement.

However, in this circuit arrangement, because all of the calculation results to be obtained are stored, large quantities of memory should be used. Therefore, even in this circuit arrangement, there was a problem that the cost thereof was increased.

Further, in an electrophotographic process type of printer or the like, because a laser, a light emitting diode (LED) or the like is actuated to emit, pulses having various widths are generated in accordance with an image signal when pulse widths of the signal which is processed by the multilevel dither method are modulated by the pulse width modulation (PWM) process. In the pulses, when the width of the output pulse is narrower than a predetermined width, the phenomenon that an LED array or a laser cannot respond to the signal nor emit, is caused. In a developing process for an electrophotography, on a photosensitive member exposed by an LED array or a laser actuated in accordance with a narrow pulse, a phenomenon that a toner cannot be stably developed is caused. By these phenomena, the problems that the image quality, in particular, the gradation property was deteriorated, was caused.

SUMMARY OF THE INVENTION

In order to solve the above-described problems, an object of the present invention is to provide an image processing device and an image processing method in which the scale of the circuit is suppressed and the gradation and the like of the image can be sufficiently reproduced.

That is, in accordance with the first aspect of the present invention, an image processing device for processing an input image so as to reproduce a halftone, comprises:

a matrix setting section for setting a threshold matrix having a plurality of elements arranged in M columns X N rows, at least two threshold values being stored in each of the elements;

an element specifying section for specifying a corresponding element of the threshold matrix in accordance with a position of a pixel in the input image; and a multilevel signal generating section for fetching the threshold values from the specified element and for generating a multilevel signal by transforming an input pixel value to one of multiple levels in accordance with the fetched threshold values;

wherein the multilevel signal generating section outputs a constant value Doutmin as the multilevel signal when a first condition that the input pixel value is smaller than or not larger than a minimum value of the threshold values, is satisfied; the multilevel signal generating section outputs a constant value Doutmax when a second condition that the input pixel value is larger than or not smaller than a maximum value of the threshold values, is satisfied; and the multilevel signal generating section outputs an interpolation value between the two constant values Doutmin and Doutmax by carrying out a predetermined operation when both of the first condition and the second condition are not satisfied.

The predetermined operation may be a linear interpolating operation using the threshold values.

The threshold values may be two threshold values $UL(e)$ and $LL(e)$ and the predetermined operation may be a liner interpolating operation expressed by the following equation;

$$\text{the interpolation value } DoutH = Doutmin + [Din - LL(e)] \times (Doutmax - Doutmin)/[UL(e) - LL(e)],$$

where Din is the input pixel value.

The multilevel signal generating section may generate the multilevel signal taking one level from desired number of multiple levels.

The multilevel signal generating section may output a value between the two constant values Doutmin and Doutmax to transform the input pixel value to one of the multiple levels.

The image processing device may further comprise: a dot shift signal generating section for generating a dot shift signal in accordance with the multilevel signal by carrying out a pattern matching process; and a pulse signal generating section for generating a pulse signal in accordance with the multilevel signal and the dot shift signal.

In accordance with the second aspect of the present invention, an image processing method for processing an input image so as to reproduce a halftone, comprises:

setting a threshold matrix having a plurality of elements arranged in M columns×N rows, at least two threshold values being stored in each of the elements;

specifying a corresponding element of the threshold matrix in accordance with a position of a pixel in the input image; and fetching the threshold values from the specified element and generating a multilevel signal by transforming an input pixel value to one of multiple levels in accordance with the fetched threshold values;

wherein in the generating of the multilevel signal, a constant value Doutmin is outputted as the multilevel signal when a first condition that the input pixel value is smaller than or not larger than a minimum value of the threshold values, is satisfied; a constant value Doutmax is outputted when a second condition that the input pixel value is larger than or not smaller than a maximum value of the threshold values, is satisfied; and an interpolation value between the two constant values Doutmin and Doutmax is outputted by carrying out a predetermined operation when both of the first condition and the second condition are not satisfied.

The predetermined operation may be a linear interpolating operation using the threshold values.

The threshold values may be two threshold values UL(e) and LL(e) and the predetermined operation may be a liner interpolating operation expressed by the following equation;

the interpolation value $DoutH = Doutmin + [Din - LL(e)] \times (Doutmax - Doutmin) / [UL(e) - LL(e)]$, where Din is the input pixel value.

In the generating of the multilevel signal, the multilevel signal taking one level from desired number of multiple levels may be generated.

In the generating of the multilevel signal, a value between the two constant values Doutmin and Doutmax may be outputted to transform the input pixel value to one of the multiple levels.

The image processing method may further comprise: generating a dot shift signal in accordance with the multilevel signal by carrying out a pattern matching process; and generating a pulse signal in accordance with the multilevel signal and the dot shift signal.

In accordance with the third aspect of the present invention, an image processing device comprises:

an address generating section for generating an address data for each pixel in accordance with an input pixel value of a signal for the pixel and a position information for indicating a position of the pixel on an image;

a plurality of lookup tables for outputting a plurality of values corresponding to the address data obtained by the address generating section;

an interpolating operation section for generating one multilevel data by a predetermined interpolating operation in accordance with the plurality of output values obtained for each pixel and outputted from the plurality of lookup tables;

a dot shift signal generating section for generating a dot shift signal by a pattern matching in accordance with the multilevel data obtained by the interpolating operation section; and a pulse signal generating section for generating a pulse signal for forming the image in accordance with the multilevel data and the dot shift signal;

wherein the plurality of lookup tables store different reference data from each other.

In accordance with the fourth aspect of the present invention, an image processing method comprises:

generating an address data for each pixel in accordance with an input pixel value of a signal for the pixel and a position information for indicating a position of the pixel on an image;

extracting a plurality of values corresponding to the address data obtained in the generating of the address data, from a plurality of predetermined lookup tables;

generating one multilevel data by a predetermined interpolating operation in accordance with the plurality of values obtained for each pixel and extracted from the plurality of lookup tables;

generating a dot shift signal by a pattern matching in accordance with the multilevel data obtained in the generating of the multilevel data; and generating a pulse signal for forming the image in accordance with the multilevel data and the dot shift signal;

wherein the plurality of lookup tables store different reference data from each other.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIGS. 2A, 2B and 2C are views showing threshold matrixes;

FIG. 11 is a view showing an image obtained by carrying out the multilevel process for an image having a uniform intermediate density in the threshold matrix having 4×8 pixels;

FIG. 12 is a view showing a dot shift signal obtained by processing the multilevel signal shown in FIG. 11;

FIG. 16 is a view showing an example of the M×N matrix which is used in the second embodiment;

PREFERRED EMBODIMENT OF THE INVENTION

First Embodiment

Multilevel Process

Figure 1:
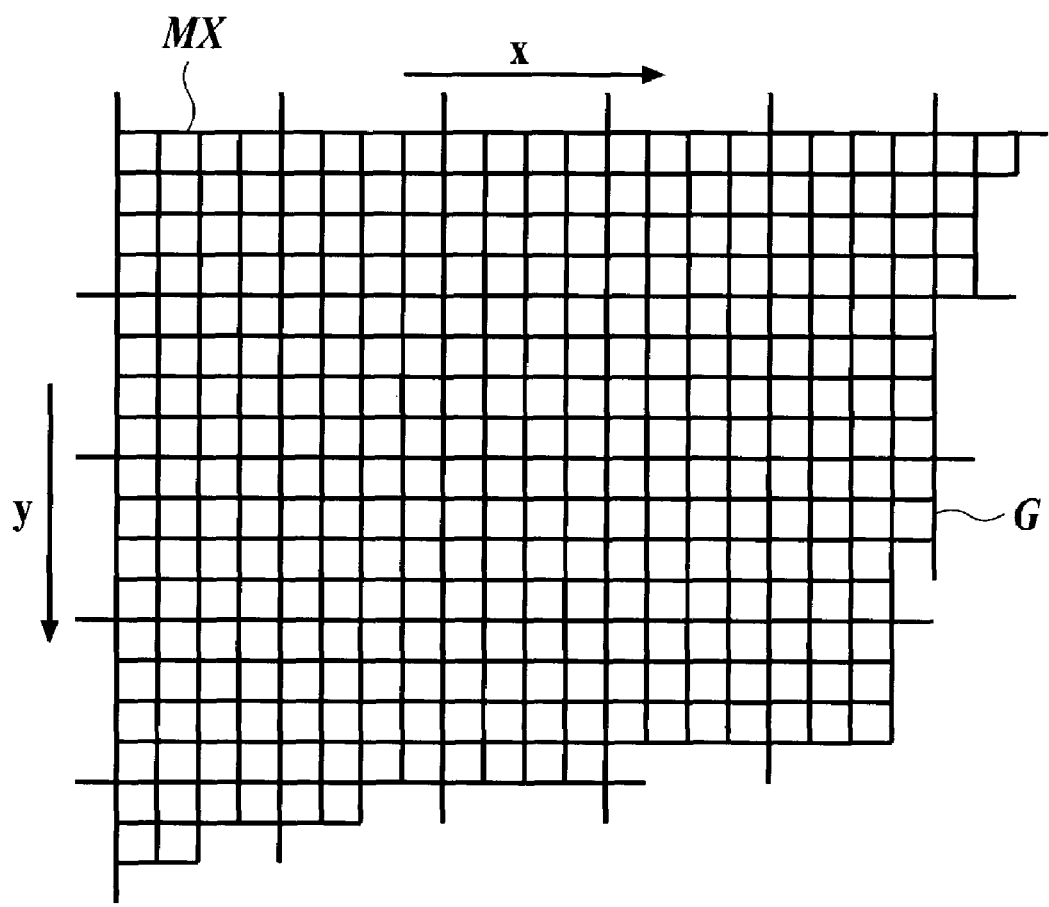
FIG. 1 is a view showing an image scanning process according to the first embodiment of the present invention.

FIG. 1 shows a scanning process for the image, which is carried out on the threshold matrix. Like a general dither method, when the threshold matrix MX has a plurality of elements arranged in M columns×N rows, the image is scanned by M pixel steps in an x-direction and by N pixel steps in a y-direction on the threshold matrix. As shown in FIG. 1, when the threshold matrix MX having 4×4 elements, the image G is scanned by 4 pixel steps in the x-direction and by 4 pixel steps in the y-direction.

The threshold matrix MX comprises n (=M×N) elements "e". As shown in FIG. 2A, in each element of the threshold matrix MX, two threshold values LL(e) and UL(e) are stored. The threshold values LL(e) and UL(e) define a threshold function Fe. Therefore, the threshold function Fe correlates with each element of the threshold matrix. FIG. 2B shows the correlating relation between each element of the threshold matrix MX and the threshold function Fe.

A pixel value of the input image data, that is, an input pixel value Din is transformed to one of the multiple levels by using the threshold values to output an output pixel value Dout.

Figure 3A:
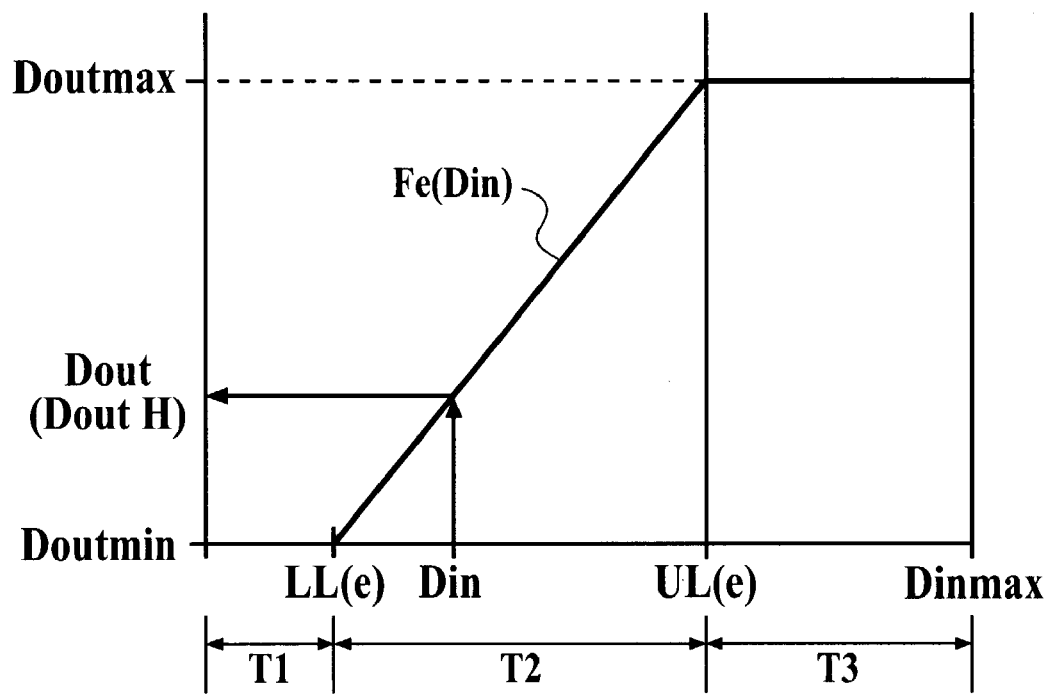
FIGS. 3A and 3B are graphs showing the threshold functions.
Figure 3B:
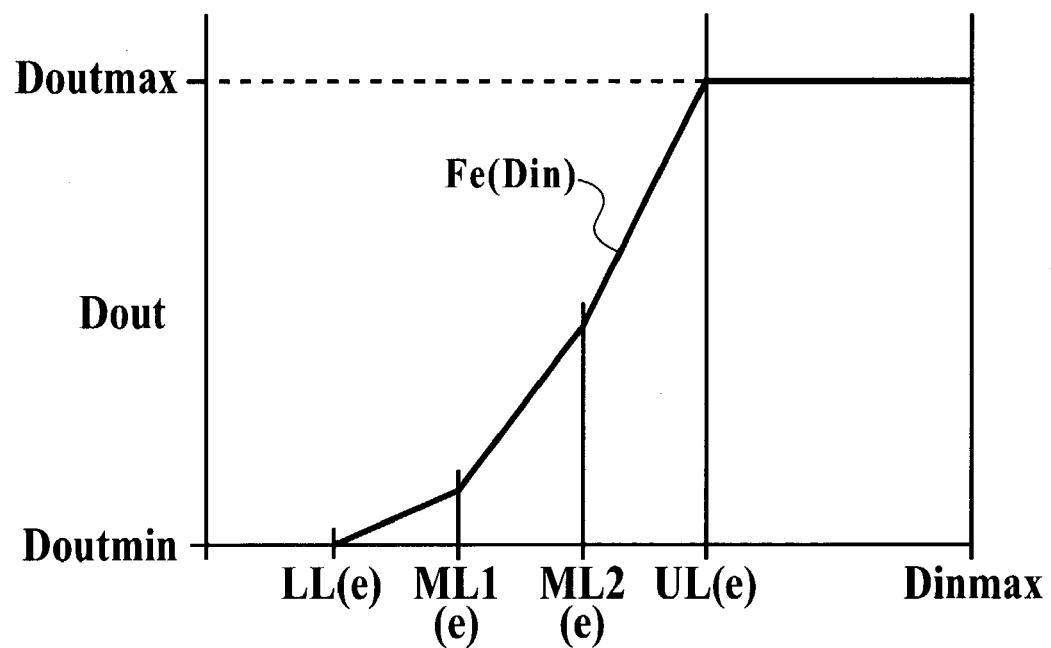

FIGS. 3A and 3B show the examples of threshold function Fe. The graph of the threshold function Fe(Din) shown in FIG. 3A is divided into three sections, that is, the minimum value section T1, the interpolation section T2 and the maximum value section T3 by two threshold values LL(e) and UL(e). When the input pixel value Din is within the minimum value section T1, the output pixel value is a minimum output value Doutmin. When the input pixel value Din is within the maximum value section T3, the output pixel value is a maximum output value Doutmax. When the input pixel value is within the interpolation section T2, the output pixel value is an interpolation value DoutH between the minimum output value Doutmin and the maximum output value Doutmax.

The multiple levels obtained by the threshold function Fe shown in FIG. 3A are expressed by Equation 1.

In case of $Din < LL(e)$, $Dout = Doutmin$      Equation 1

In case of $Din > UL(e)$, $Dout = Doutmax$

Figure 4:
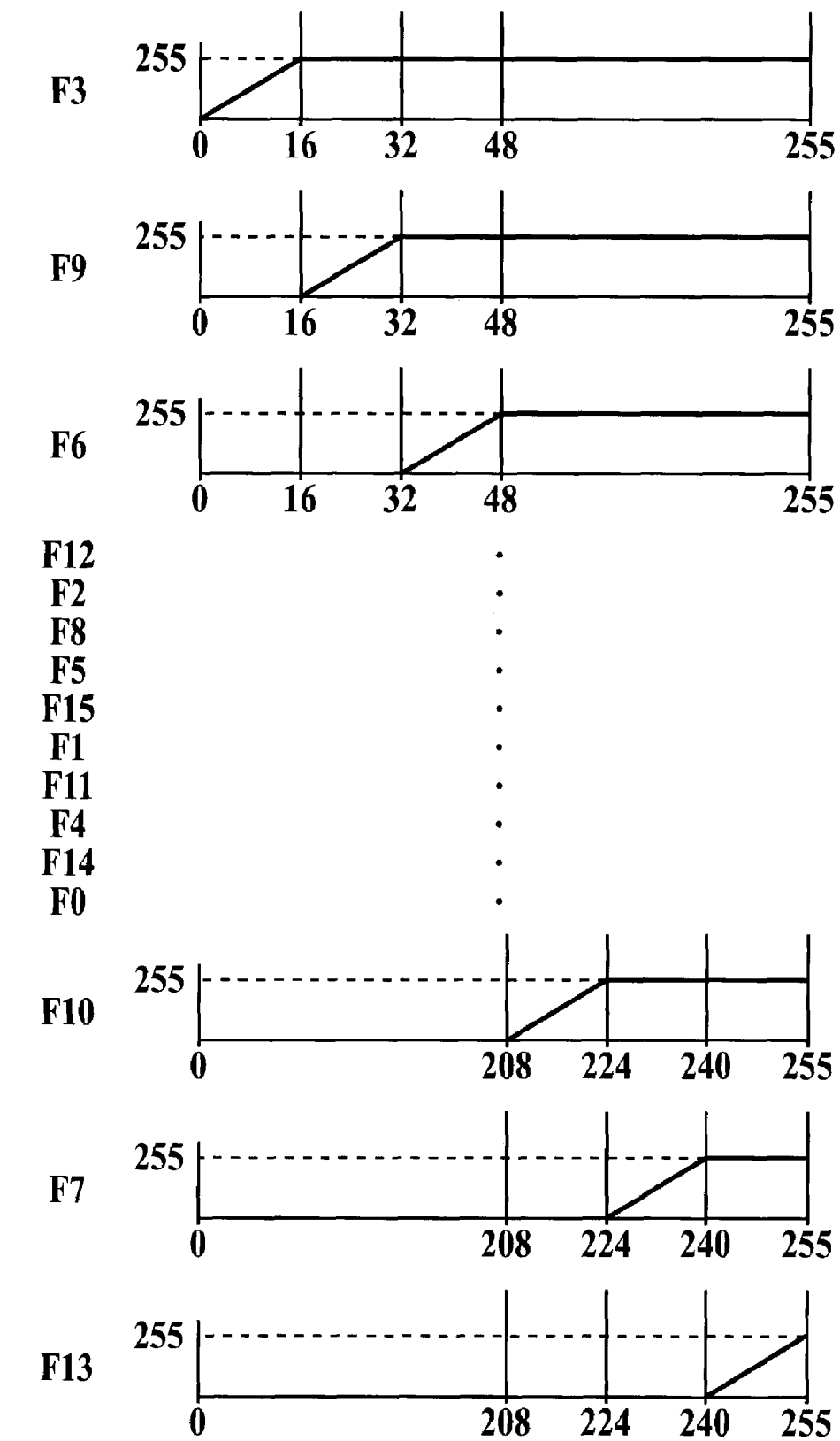
FIG. 4 is a view showing an example of an arrangement of the threshold functions in the threshold matrix.
Figure 5:
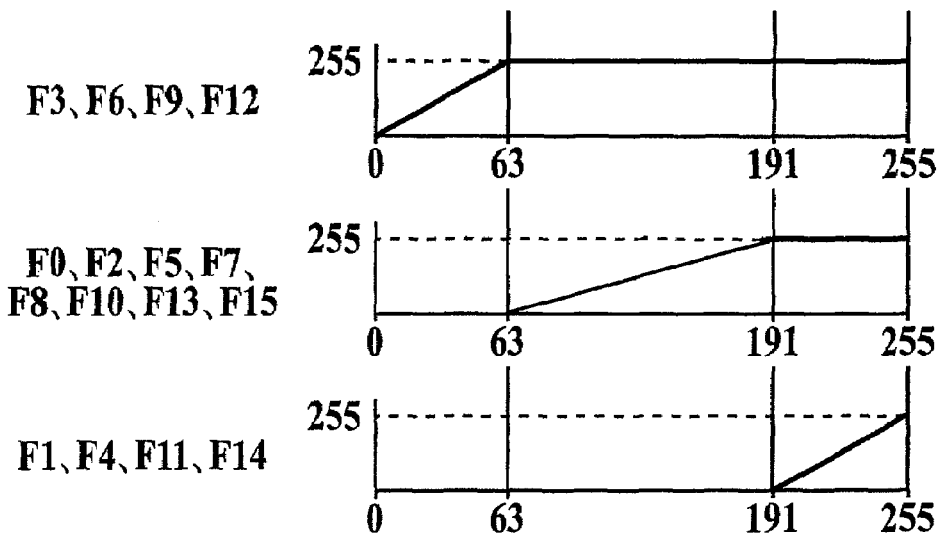
FIG. 5 is a view showing another example of an arrangement of the threshold functions in the threshold matrix.

In case of $LL(e) \leq Din \leq UL(e)$, $Dout = Doutmin + [Din - LL(e)] \times (Doutmax - Doutmin) / [UL(e) - LL(e)]$ FIGS. 4 and 5 show how the threshold function Fe(Din) defined by two threshold values LL(e) and UL(e) stored in each element of the threshold matrix is arranged on the threshold matrix. In these figures, the threshold functions are shown in the following concrete conditions: M is 4, N is 4, 8-bit input and output is carried out, Doutmin is 0 and Doutmax is 255.

In the example shown in FIG. 4, all of the threshold functions F0(Din) to F15(Din) are different from each other. The threshold values LL(e) and UL(e) have the following values.

| | |
|---|---|
| LL(3) = 0, | UL(3) = 16 |
| LL(9) = 16, | UL(9) = 32 |
| LL(6) = 32, | UL(6) = 48 |
| LL(12) = 48, | UL(12) = 64 |
| LL(2) = 64, | UL(2) = 80 |
| LL(8) = 80, | UL(8) = 96 |
| LL(5) = 96, | UL(5) = 112 |
| LL(15) = 112, | UL(15) = 128 |
| LL(1) = 128, | UL(1) = 144 |
| LL(11) = 144, | UL(11) = 160 |
| LL(4) = 160, | UL(4) = 176 |
| LL(14) = 176, | UL(14) = 192 |
| LL(0) = 192, | UL(0) = 208 |
| LL(10) = 208, | UL(10) = 224 |
| LL(7) = 224, | UL(7) = 240 |
| LL(13) = 240, | UL(13) = 255 |

In FIG. 4, only the threshold functions F3, F9, F6, F10, F7 and F13 defined by the upper three pairs of threshold values LL(3), UL(3), LL(9), UL(9) and LL(6), UL(6) and the lower three pairs of threshold values LL(10), UL(10), LL(7), UL(7) and LL(13), UL(13), are shown and the other threshold functions are omitted. However, the threshold functions F12 to F0 defined by the other threshold values LL(12), UL(12) to LL(0), UL(0) are defined by the above-described threshold values.

As shown in FIG. 5, the same threshold function Fe may be assigned to a plurality of elements. In FIG. 5, the threshold functions Fe are incorporated into the following three functions.

LL(3)=LL(6)=LL(9)=LL(12)=0
UL(3)=UL(6)=UL(9)=UL(12)=63
LL(0)=LL(2)=LL(5)=LL(7)=LL(8)=LL(10)=LL(13)=LL(15)=63
UL(0)=UL(2)=UL(5)=UL(7)=UL(8)=UL(10)=UL(13)=UL(15)=191
LL(1)=LL(4)=LL(11)=LL(14)=191
UL(1)=UL(4)=UL(11)=UL(14)=255

An example of the practical calculation for the multilevel process described above will be explained as follows.

Image Processing Device

Figure 6:
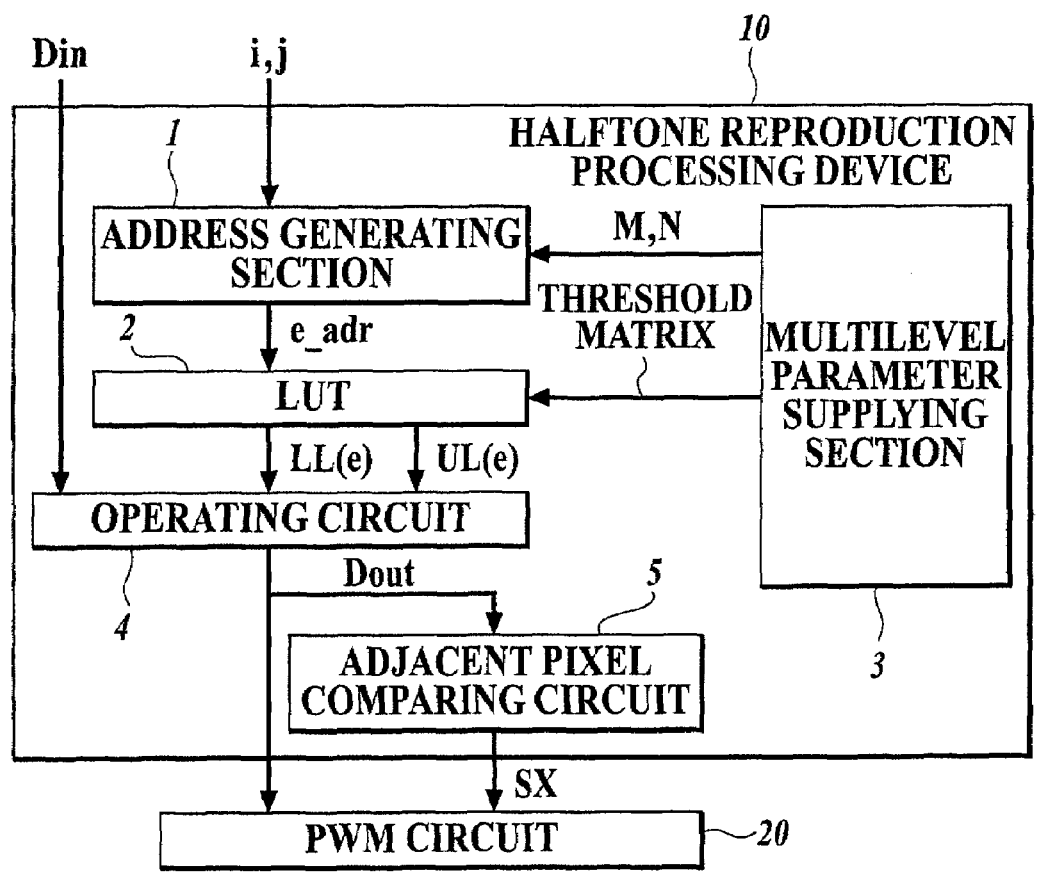
FIG. 6 is a view showing a construction of the image processing device according to the first embodiment.

FIG. 6 is a block diagram of the image processing device according to the first embodiment.

The image processing device comprises a halftone reproduction processing device 10 and a PWM circuit 20 as a pulse signal generating section. The halftone reproduction processing device 10 comprises an address generating section 1 as an element specifying section for specifying an element of the threshold matrix MX, an LUT 2 which is a storing section as a matrix setting section, a multilevel parameter supplying section 3, an operating circuit 4 as a multilevel section, and an adjacent pixel comparing circuit 5 as a dot shift signal generating section.

At first, the multilevel parameter supplying section 3 previously supplies the size M, N of the threshold matrix MX to the address generating section 1 as parameters for the multilevel process and two threshold values LL(e) and UL(e) (e=0, 1, 2, 3, . . . n−1) to each element of the LUT 2.

The address generating section 1 calculates an address e_adr for specifying a predetermined element "e" of the threshold matrix MX in accordance with a position (i, j) of the specified pixel in the image and the size M, N of the threshold matrix MX to output it to the LUT 2.

The method of the calculation is approximately the same as a conventional dither method and is carried out as follows.

The numbers are assigned to each element of the threshold matrix MX in order.

In FIG. 2C, the numbers are assigned to each element of the threshold matrix having the size of M=4 and N=4. Hereinafter, these numbers "e" are used by specifying the element of the threshold matrix MX.

The number "e" for specifying the element of the threshold matrix MX is expressed by the following equation.

$$e = sai + saj \times M \quad \text{Equation 2}$$

where $sai = i \ \% \ M$ $saj = j \ \% \ N$

The "sai" and "saj" indicate that the element "e" corresponding to the specified pixel (i, j) is arranged in "sai"-th column and "saj"-th row of the M×N matrix MX.

The operator "%" means a remainder obtained by dividing a left numerical value by a right numerical value. In case that the position "i, j" is inputted as shown in Equation 2, in order to calculate the "sai" and "saj", the division or the like is required. However, a person having an ordinary skill in the art ought to recognize that the "sai" and "saj" can be easily calculated without the division by using a clock signal outputted from a circuit, a timing signal for indicating an image effective area and the like.

The address e_adr corresponding to the element "e" of the threshold matrix MX, which is specified by the position of the specified pixel in the image, is expressed, for example, by the following Equation 3.

$$e\_adr = e \times S + B \quad \text{Equation 3}$$

where S is the memory size for storing the threshold value. When the LL(e) and the UL(e) are 1-byte positive integers respectively, because the number of the threshold values is 2, S is 2. In case of an color image, a larger size is required. For example, in case of 4 colors, S increases by 4 times and 8 bytes are required. The B is a base address for indicating the first address of the memory constituting the LUT 2. In case of S=2 and B=0, the LL(e) and UL(e) supplied from the multilevel parameter supplying section 3 are stored in the LUT 2 as follows when an 8-bit I/O memory is used.

| e_adr | data |
|---|---|
| 0 | LL(0) |
| 1 | UL(0) |
| 2 | LL(1) |
| 3 | UL(1) |
| 4 | LL(2) |
| 5 | UL(2) |
| 6 | LL(3) |
| 7 | UL(3) |
| 8 | LL(4) |
| 9 | UL(4) |
| . | . |
| . | . |
| . | . |

When the address e_adr is inputted into the LUT 2, two threshold values LL(e) and UL(e) are outputted to input them into the operating circuit 4. At the same time, the input image signal Din for the specified pixel is inputted into the operating circuit 4.

The operations carried out by the operating circuit 4 are expressed by Equation 1. By carrying out these operations, the multilevel signal Dout is outputted.

In case of $Din < LL(e)$, $Dout = Doutmin$     Equation 1

In case of $Din > UL(e)$, $Dout = Doutmax$

In case of $LL(e) \leq Din \leq UL(e)$, $Dout = Doutmin + [Din - LL(e)] \times (Doutmax - Doutmin) / [UL(e) - LL(e)]$ In case of 8-bit input/output, Doutmin=0 and Doutmax=255, Equation 1 is expressed as the following Equation 4.

In case of $Din < LL(e)$, $Dout = 0$     Equation 4

In case of $Din > UL(e)$, $Dout = 255$

In case of $LL(e) \leq Din \leq UL(e)$, $Dout = [Din - LL(e)] \times 255 / [UL(e) - LL(e)]$ In this case, each calculation result of the term 255/[UL(e)−LL(e)] is previously stored in a lookup table (not shown). Then, by inputting UL(e)−LL(e) as an address in order to obtain the above calculation result, the operating accuracy which is the same as that of the division can be obtained without a dividing circuit.

Figure 7:
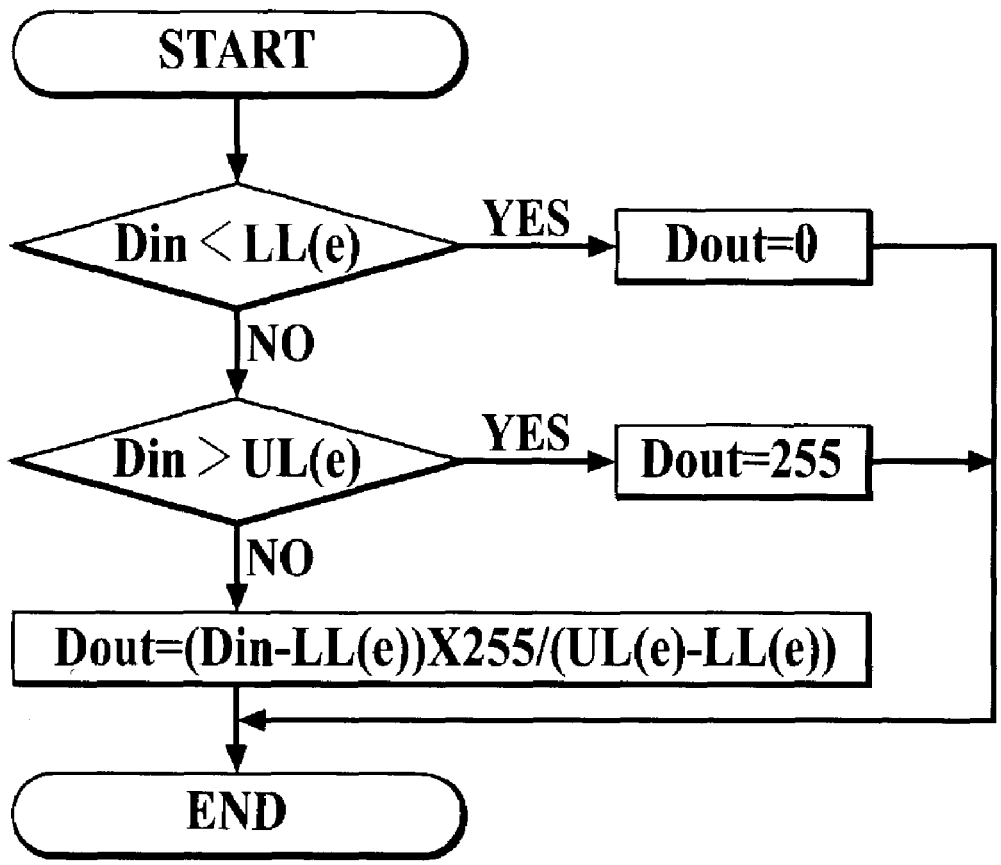
FIG. 7 is a flowchart of the multilevel processing operation.

FIG. 7 shows a flowchart of the operation carried out by using the above equations.

When the output pixel value Dout takes, for example, one of the integers 0 to 255, the number of the multiple levels for an image is 256. In order to change the number of the multiple levels in case of necessity and to obtain the limited multilevel output Dout', the following operations may be carried out for the output pixel value Dout.

$Dout' = Dout \times (\text{desired number of multiple levels} - 1) / Doutmax$

For example, when the Doutmax is outputted by 8-bit and the number of the multiple levels is changed to 4, the following operation may be carried out.

$Dout' = Dout \times 3 / 255$

Thereby, the output can be limited to the desired number of the multiple levels.

As a threshold value, in addition to UL(e) and LL(e), by using the intermediate values ML1, ML2, . . . , the graph obtained by joining a plurality of lines which have different gradients from each other is formed in the interpolation section T2 of the threshold function Fe(Din). Therefore, it is possible to prepare an image data having various gradation properties. FIG. 3A is an example of the threshold function Fe (Din) which is defined by one straight line in the interpolation section T2. FIG. 3B is an example of the threshold function Fe(Din) which is defined by three straight lines in the interpolation section T2 by increasing the threshold values from two to four (UL(e), LL(e), ML1(e) and ML2(e)).

As explained above, by the halftone reproduction processing device 10 shown in FIG. 6, it is possible to prepare the multilevel signal according to the property of the image forming device or that of the image display device. In the first embodiment, as explained below, the multilevel signal is processed according to the property of the image forming device or that of the image display device. This process is carried out so that fragments of a broken pulse signal are continuous by adding dot shift information to the multilevel image signal. Then, a pulse signal which is suitable for the image forming in an electrophotographic process or the like, is prepared.

The multilevel signal Dout generated by the operating circuit 4 is supplied to the adjacent pixel comparing circuit 5. In the adjacent pixel comparing circuit 5, the multilevel signals for a plurality of pixels are stored. The values of the multilevel signals are compared with each other between the adjacent pixels. The comparing result is outputted as a dot shift signal SX. The dot shift signal SX is 2-bit signal. The information for shifting a dot to one of right, center and left, is outputted by coding it with three values 2, 0 and 1, respectively.

Figure 8:
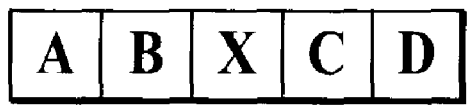
FIG. 8 is a view showing a template.

Next, the method for generating the dot shift signal SX will be explained. FIG. 8 is a template showing a specified pixel X and each position of pixels A, B, C and D arranged near the pixel X. The specified pixel X and the pixels A, B, C and D arranged near the pixel X are arranged in a straight horizontal line.

The multilevel signal Dout generated by the operating circuit 4 moves in the template so as to input it from the pixel D of the template and to output it from the pixel A. Then, each value AV, BV, XV, CV and DV of the pixels A, B, X, C and D in the template is compared with other. In accordance with the comparing result, the dot shift signal SX for the specified pixel X is determined.

Figure 9:
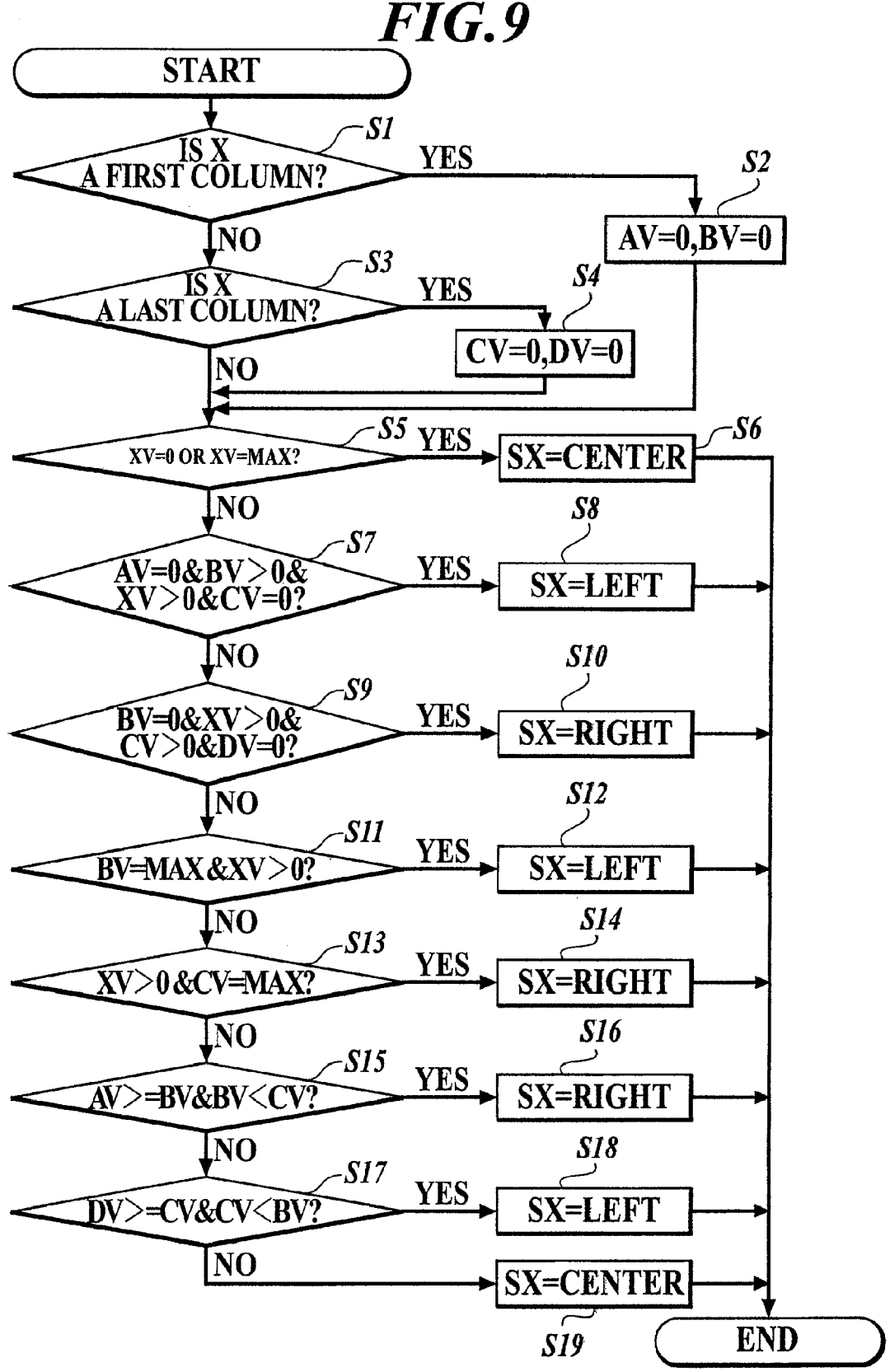
FIG. 9 is a flowchart showing the logical judgment for generating a dot shift signal.

In FIG. 9, the flowchart for indicating the process for comparing the values of the pixels is shown. The process for comparing the values is explained with reference to FIG. 9.

In case that the specified pixel X is arranged at the beginning of a line (at the left end) (S1; Yes), because there is no pixel on the left side of the pixel X, the values AV and BV are 0 (S2). In case that the specified pixel X is arranged at the end of a line (at the right end) (S3; Yes), because there is no pixel on the right side of the pixel X, the values CV and DV are 0 (S4).

In case that it is judged to be "No" in the steps S1 and S3, that is, in case of the pixel except the pixel arranged at the right or left end of the line, the dot shift signal SX for the specified pixel X is set by using the multilevel signal Dout in accordance with the following conditions.

In case of XV=0 or XV=max (maximum value; in case of 8 bits, the maximum value is 255.) (S5; Yes), the signal SX is set to "center" (S6).

In case that the value XV is not 0 nor the maximum value (S5; No) and in case of AV=0 and BV>0 and XV> and CV=0 (S7; Yes), the signal SX is set to "left" (S8).

In case that the conditions described in the step S7 are not satisfied (S7; No) and in case of BV=0 and XV>0 and CV>0 and DV=0 (S9; Yes), the signal SX is set to "right" (S10).

In case that the conditions described in the step S9 are not satisfied (S9; No) and in case of BV=max and XV>0 (S11; Yes), the signal SX is set to "left" (S12).

In case that the conditions described in the step S11 are not satisfied (S11; No) and in case of XV>0 and CV=max (S13; Yes), the signal SX is set to "right" (S14).

In case that the conditions described in the step S13 are not satisfied (S13; No) and in case of AV$\geq$BV and BV<CV (S15; Yes), the signal SX is set to "right" (S16).

In case that the conditions described in the step S15 are not satisfied (S15; No) and in case of DV$\geq$CV and CV<BV (S17; Yes), the signal SX is set to "left" (S18).

In case that the conditions described in the step S17 are not satisfied (S17; No), the dot shift signal SX is set to "center" (S19). Then, the process is finished.

Figure 10:
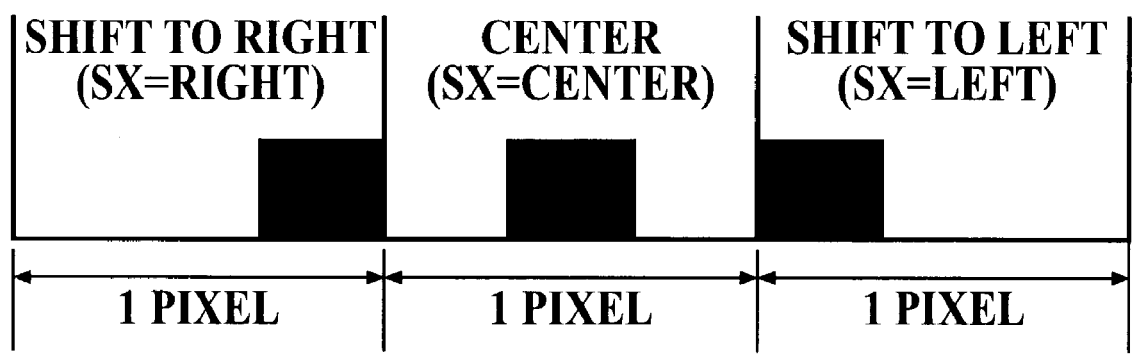
FIG. 10 is a view showing the dot shift.

As described above, in accordance the template matching carried out by using five pixel values including the specified pixel X, the dot shift signal SX for the specified pixel X is determined and outputted. By supplying the dot shift signal SX and the multilevel signal Dout to the PWM circuit, a pulse signal P is generated. In this embodiment, as shown in FIG. 10, the dot shift is carried out to generate a pulse signal so as to shift a pulse to right, center or left in one pixel.

The pulse signal is supplied to a laser actuating circuit. Then, the dots of the pulse signal are generated in the electrophotographic process or the like.

FIG. 11 shows an image obtained by carrying out the multilevel process to an image having a uniform intermediate density having a pixel value of 50% in the threshold matrix having 4×8 pixels. As a threshold matrix, the example shown in FIG. 5 according to the first embodiment is used. The values shown in FIG. 11 denotes the multilevel signal Dout by percentage. FIG. 12 shows the dot shift signal SX obtained by processing the multilevel signal Dout shown in FIG. 11 in the adjacent pixel comparing circuit 5. As described above, the dot shift signal SX is 2-bit signal taking one of three values 0, 1 and 2. However, in FIG. 12, in order to easily explain the dot shift, the shift directions which the three values indicate are directly shown.

Figure 13A:
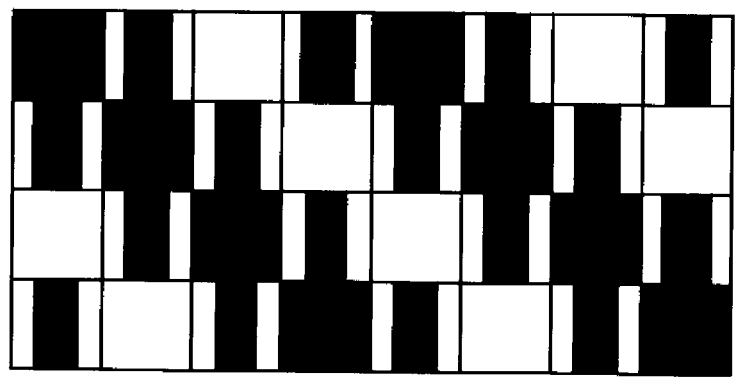
FIGS. 13A and 13B are views showing each pulse signal outputted from the PWM circuit.
Figure 13B:
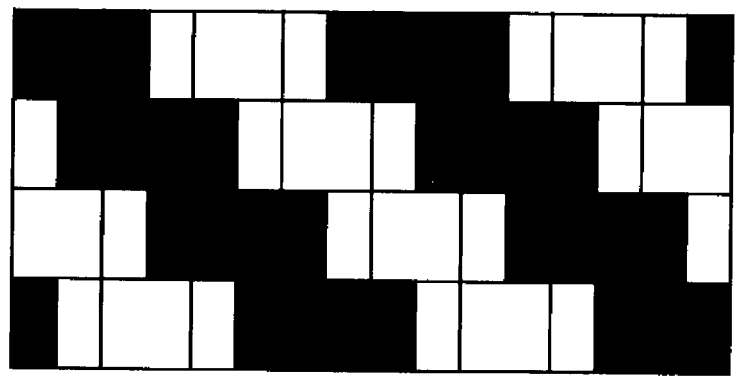

FIGS. 13A and 13B show a pulse signal outputted from the PWM circuit 20 and show that the pulse-width modulation is carried out in accordance with the result of the multilevel process, which is shown in FIG. 11. In FIGS. 13A and 13B, a white part of each pixel denotes "off" and a black part thereof denotes "on". The multilevel signal Dout which is indicated by percentage in FIG. 11, is expressed by the area ratio of the dot in one pixel.

FIG. 13A shows the pulse signal for which the dot shift process is not carried out. In this case, as shown in the figure, the pulse dots having a narrow width are scattered around the pulse dots having a wide width.

FIG. 13B shows the pulse signal including the dot shift information. That is, FIG. 13B shows the pulse signal for which the dot shift process is carried out by inputting the multilevel signal shown in FIG. 11 and the dot shift signal SX shown in FIG. 12 into the PWM circuit 20.

As shown in FIGS. 13A and 13B, because the adjacent pulse dots are combined with each other by the dot shift process, the possibility of the generation of the pulses having a narrow width is decreased. Further, the pulses having a wide width are increased. In the electrophotographic process or the like, a laser, an LED or the like is actuated to emit. However, when the width of the pulse is wide, the emission of the laser or the like is reliably carried out. Further, the development of the dot, which is carried out by a toner is stable. Therefore, the dot shift makes the development of the dot be stable. As a result, the image quality is improved.

In the present invention, two or more threshold values are prepared in each pixel of the matrix. The value of the input image signal is compared with the threshold values. The interpolating operation is carried out by using the threshold values. Therefore, it is possible to obtain the multilevel output.

Thereby, it is possible to drastically reduce the memory capacity for obtaining the desired number of the multiple levels. In particular, it can be easy that the hardware for the image processing circuit having a desired halftone reproduction property is provided.

In the present invention, the image data having various gradation properties is prepared.

Further, in the present invention, by carrying out the dot shift process for the multilevel signal prepared by the multilevel dither process, in accordance with the pattern matching, the image processing device which is suitable for a printer for forming an image by actuating an LED array or a laser in the PWM method, can be realized.

Second Embodiment

Hereinafter, the second embodiment of the image processing device and the image processing method according to the present invention will be explained with reference to the figures.

Figure 14:
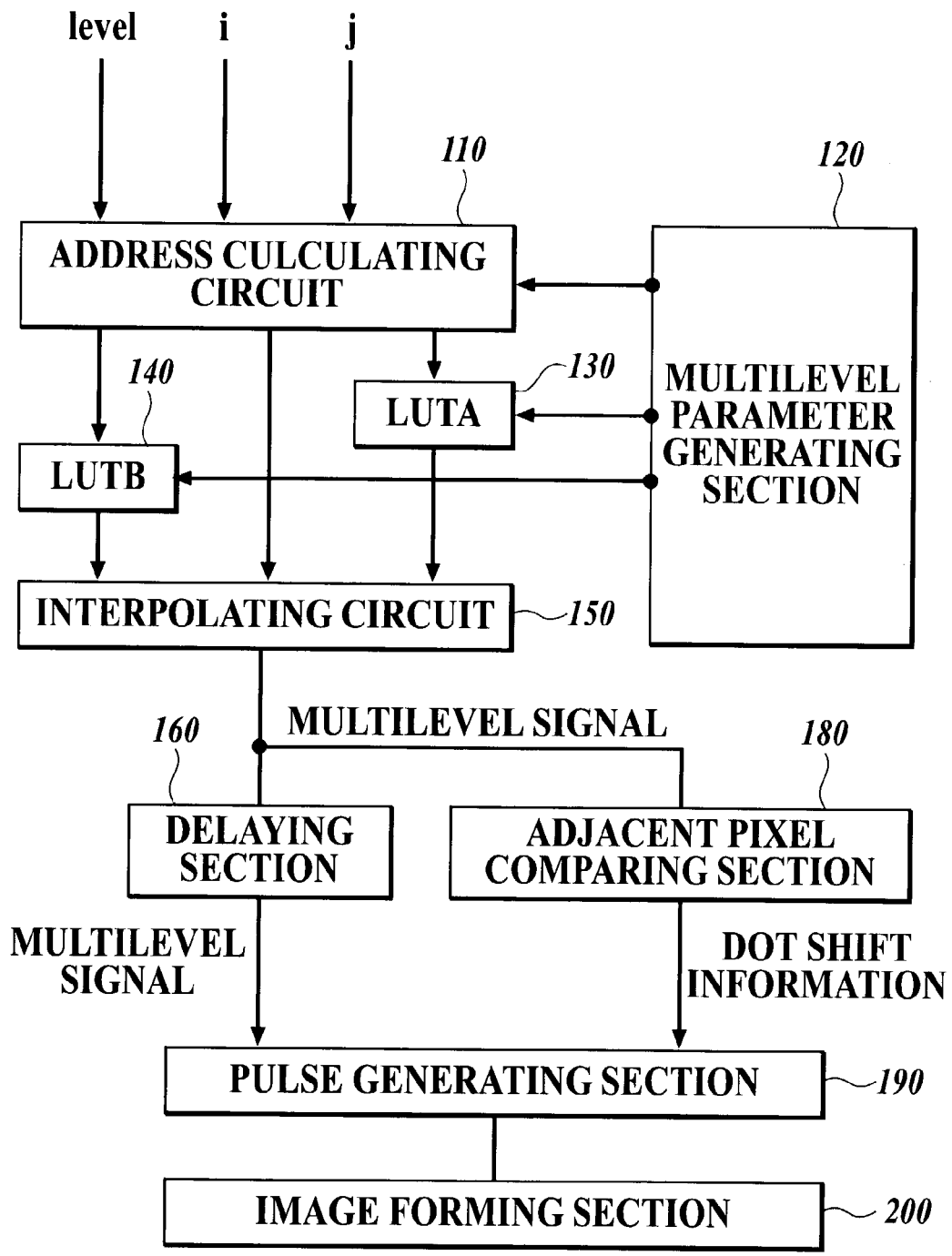
FIG. 14 is a block diagram showing the image processing device according to the second embodiment of the present invention.

As shown in FIG. 14, the image processing device according to this embodiment comprises an address calculating circuit 110 as an address generating section for generating an address data ADR for each pixel in accordance with an input pixel value "level" as a level of a signal for each pixel and a position information "i, j" for indicating a position of the pixel on an image; a LUTA 130 and a LUTB 140 which are a plurality of lookup tables for outputting a plurality of values corresponding to the address data ADR obtained by the address calculating circuit 110; an interpolating circuit 150 which is an interpolating operation section for generating one multilevel data by a predetermined interpolating operation in accordance with the plurality of output values obtained for each pixel and outputted from the plurality of lookup tables; an adjacent pixel comparing section 180 as a dot shift signal generating section for generating a dot shift signal by a pattern matching in accordance with the multilevel data obtained by the interpolating circuit 150; and a pulse generating section 190 which is a pulse signal generating section for generating a pulse signal for forming the image in accordance with the multilevel data and the dot shift signal.

It is preferable that the plurality of lookup tables store different reference data from each other.

Further, the image processing method according to the present invention, which includes the method for calculating the multilevel signal obtained by the address calculating circuit 110, the lookup tables (LUTA 130, LUTB 140) and the interpolating circuit 150, will be explained with reference to FIG. 15.

Figure 15:
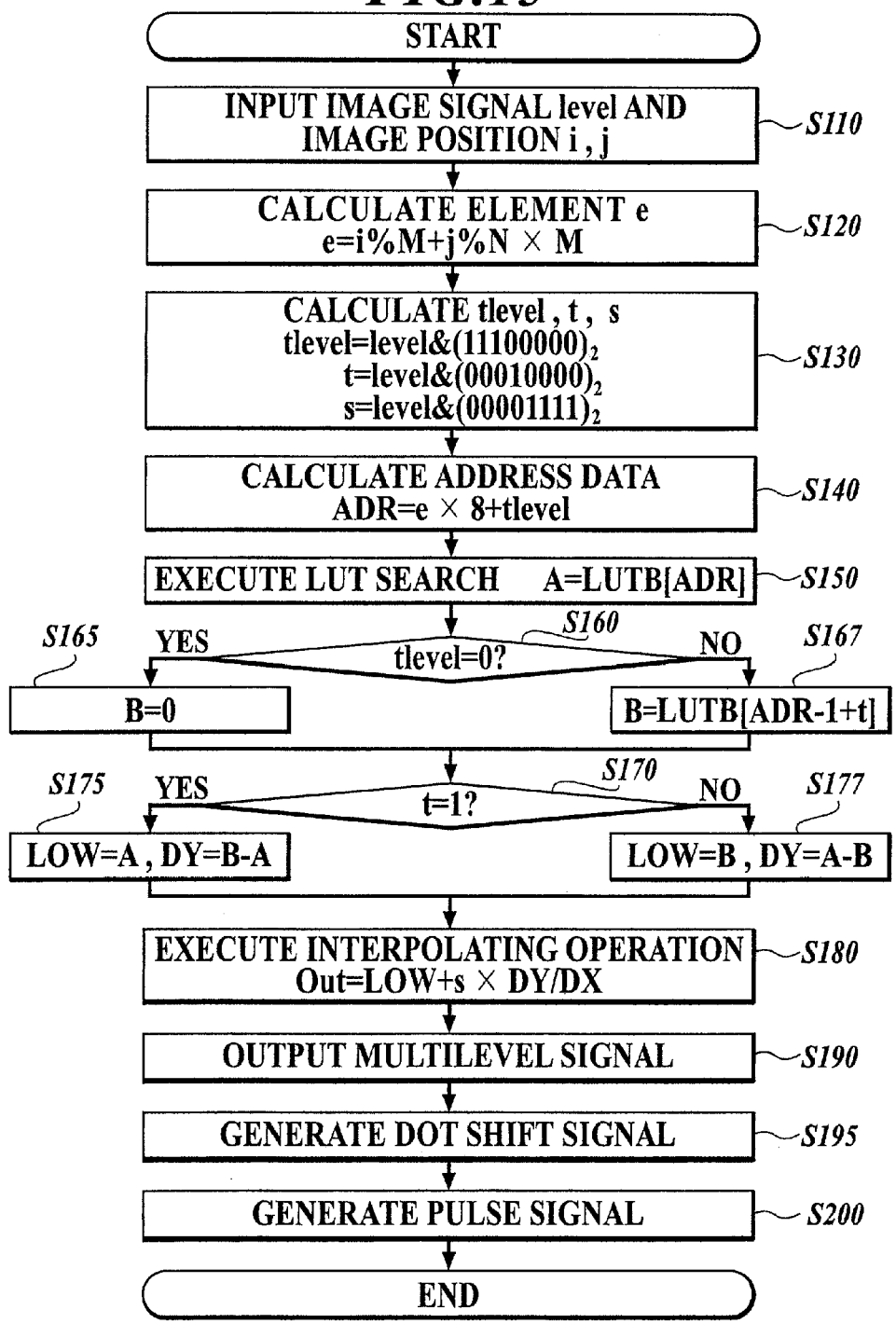
FIG. 15 is a flowchart for explaining the image processing method according to the second embodiment of the present invention.

As shown in FIG. 15, the image processing method according to the second embodiment, comprises: an address generating step (step S140) for generating an address data ADR for each pixel in accordance with an input pixel value "level" as a level of a signal for each pixel and a position information "i, j" for indicating a position of the pixel on an image; an extracting step (steps S150, S165 and S167) for extracting a plurality of values corresponding to the address data obtained in the address generating step, from a plurality of predetermined lookup tables (LUT); an interpolating operation step (steps S175, S177 and S180) for generating one multilevel data by a predetermined interpolating operation in accordance with the plurality of values obtained for each pixel and extracted from the plurality of lookup tables; a dot shift signal generating step (step S195) for generating a dot shift signal by a pattern matching in accordance with the multilevel data obtained in the interpolating operation step; and a pulse signal generating step (step S200) for generating a pulse signal for forming the image in accordance with the multilevel data and the dot shift signal.

In the step S110, when the image to be processed is divided into pixels by using the threshold matrix obtained by the dither method, the input pixel value (image signal "level") which is a level of a signal for each pixel and the position information (image position "i, j") for indicating the position of the pixel on the image are inputted. The image signal "level" is a signal corresponding to the input density of the image.

Figure 16:
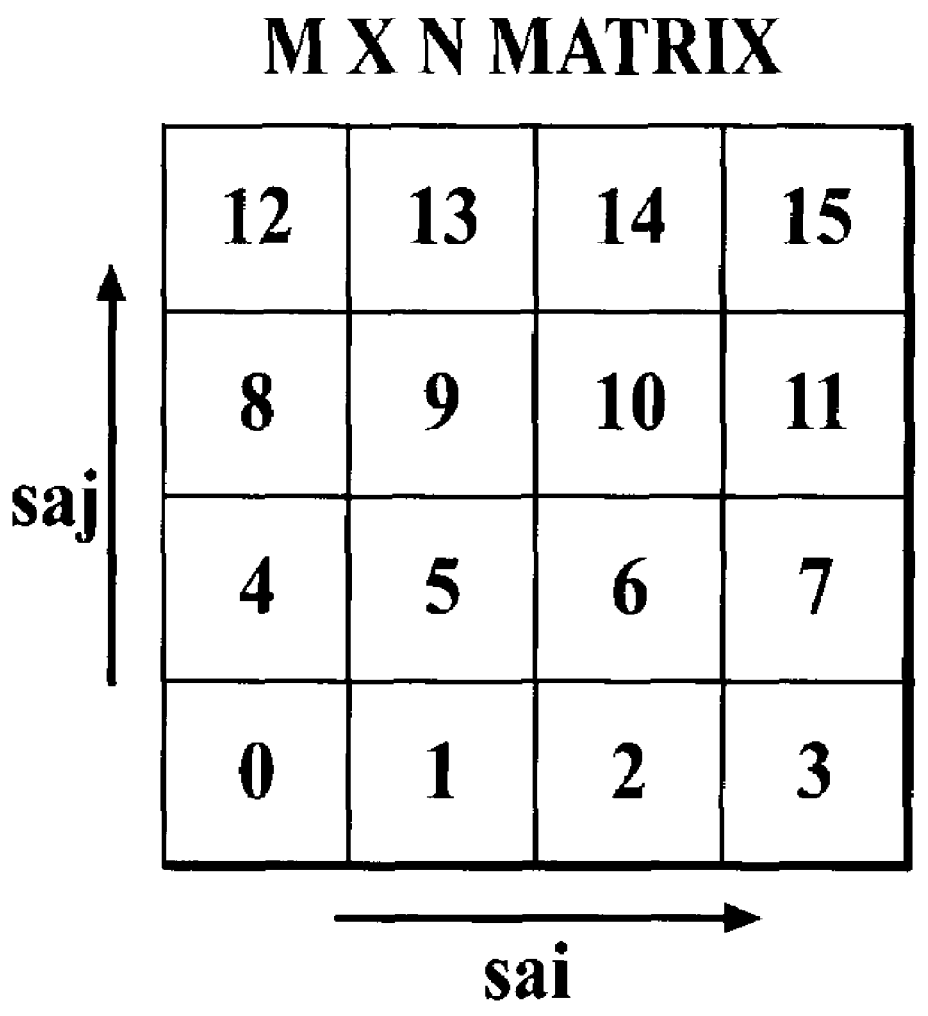

In this embodiment, for example, as shown in FIG. 16, the threshold matrix is an M×N matrix. In FIG. 16, the threshold matrix having M=4 and N=4 is shown. However, the parameters M and N may be optional numbers. The numbers are assigned to each element of the matrix in order in accordance with the raster scanning. When the angle of the halftone dot is changed or the like, there is some possibility that the parameters M and N have different numbers from each other. Further, the numbers assigned to each element are changed whenever M and N are changed. The parameters M and N are supplied by the multilevel parameter generating section 120.

In the step S120, the number "e" assigned to an element corresponding to the specified pixel is calculated. The number "e" indicating the element of the matrix is expressed by the following equations.

$$e = sai + saj \times M \qquad \text{Equation 5}$$

where $sai = (i + (j/N) \times \alpha) \% M$ $$saj = j \% N \qquad \text{Equation 6}$$

In Equation 6, "sai" and "saj" indicate that an element corresponding to the specified element (i, j) is arranged in the "sai"-th row and the "saj"-th column of the M×N matrix as shown in FIG. 16. Hereinafter, "sai" and "saj" are used as variable numbers for specifying each element of the M×N matrix.

In the equations, $\alpha$ is a shift parameter and is satisfied with the following formula.

$$0 \leq \alpha < M \times N$$

The range of the number "e" depends on the parameters M and N. For example, when the maximum value of M×N is 256, the range of the number "e" is 8 bits. The operator "%" means a remainder obtained by dividing a left numerical value by a right numerical value.

In this case, when the parameters i, j are used in order to specify the element, the division or the like is required. As a result, the calculation is complicated. However, as described above, by using a pixel clock signal "clock" and an H-valid signal hv for the inputted image, the calculation for Equation 6 becomes simple like the following Equation 7.

In case that the signal hv is "on":

$saj$++; if $(saj == N)$ $saj = 0$;

$sai$ += $\alpha$; if $(sai > M)$ $sai = 0$;

In case that the signal "clock" is "on":

$$sai\text{++; if } (sai == M) \, sai = 0 \qquad \text{Equation 7}$$

Next, in the step S130, the predetermined data are obtained in accordance with the image signal "level". For example, when the range of the image signal "level" is 8 bits and the image signal "level" is interpolated at a representing value corresponding to each representing point by using, for example, 16 representing points (the number of the represent values Np=16), the number of the intervals DX between the representing points is 16 levels.

In this case, the predetermined data are a value "tlevel", a switch "t" and an interpolation coefficient "s", which are described below. Hereinafter, the method for calculating the above values will be explained.

Further, two lookup tables which are used in the second embodiment will be explained. A value obtained by dividing the 8-bit image signal "level" by the interval DX indicates the nearest representing point "plevel" (plevel=level/DX, where level is the image signal "level".)

The number of the representing points "plevel" is 16. The represent points are attached to the numbers 0 to 15, respectively. The information relating to the representing point "plevel" is assigned to upper 4 bits of the image signal "level". Thereby, the image signal "level" is inserted between the representing values V(plevel) and V(plevel+1) corresponding to the representing points "plevel" and "plevel+1". It is possible to carry out the interpolating operation by using a value "s" (s=level % DX), which will be described below. The image signal "Out" obtained by the interpolating operation is calculated by the following Equation 8.

$$\text{Out}=V(p\text{level})\times(1-s)/DX+V(p\text{level}+1)\times s/DX \quad \text{Equation 8}$$

In Equation 8, in order to process one pixel, that is to calculate the image signal "Out", the two representing values V(plevel) and V(plevel+1) are required. In general, when the representing value is required, the representing value is extracted from a memory in which the representing values are stored so as to correlate with the representing points. However, it is difficult to fetch two values by accessing the same memory twice during one pixel clock. When two memories storing the same information are used and two values are extracted by the accessing the two memories simultaneously, it is possible to obtain two values. However, because the information stored in the memories are redundant, the above method is not desirable.

Figure 17:
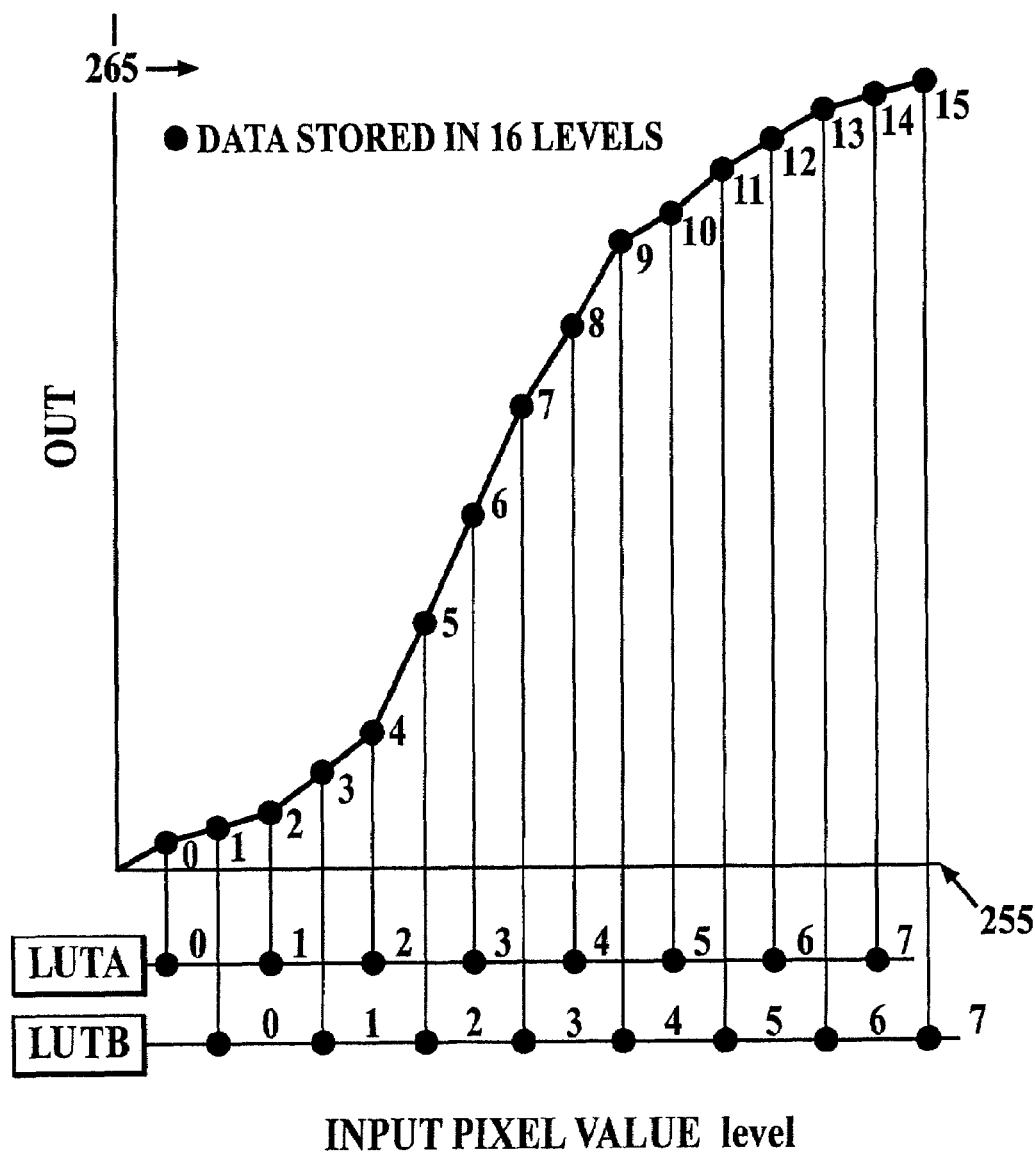
FIG. 17 is a view for explaining the data stored in two LUTs used in the second embodiment.

By using two memories having a half capacity of a former memory, as shown in FIG. 17, the representing points are stored in each memory so as to divide them into the even-numbered representing points and the odd-numbered representing points.

As shown in FIG. 17, the representing values corresponding to the even-numbered representing points, that is, the representing points 0, 2, 4, 6, 8, 10, 12 and 14 are stored in one lookup table (LUTA). The representing values corresponding to the odd-numbered representing points, that is, the representing points 1, 3, 5, 7, 9, 11, 13 and 15 are stored in the other lookup table (LUTB).

In order to use these two lookup tables, as shown in following Equation 9, the value "tlevel" is defined at upper 3 bits of the range (8-bit) of the image signal "level".

$$t\text{level}=(\text{level}/DX)/2$$

As shown in the following Equation 9, one bit which is arranged at upper fourth bit of the image signal "level", is fetched as a switch "t" (that is, t=0 or 1). Further, the lower 4 bits of the image signal "level" are fetched as an interpolation coefficient "s". The value "tlevel", the switch "t" and the interpolation coefficient "s" are used in the following steps as described below.

$$t\text{level}=\text{level} \ \& \ (11100000)_2$$

$$t=\text{level} \ \& \ (00010000)_2$$

$$s=\text{level} \ \& \ (00001111)_2 \quad \text{Equation 9}$$

In the step S140, the address data ADR which is an input address to be inputted into two LUTs, is calculated in accordance with the following Equation 10.

$$\text{ADR}=e\times 2^3+t\text{level} \quad \text{Equation 10}$$

In Equation 10, because the range of the element "e" is 8 bits and the range of the value "tlevel" is 3 bits, the range of the address data ADR is 11 bits.

In the step S150, in accordance with the input address ADR calculated in the step S140, the LUT search is carried out to extract the value A from the LUTA 130 (A=LUTA[ADR]).

Next, the value B is searched from the LUTB. However, before the search, in the step S160, it is judged whether the value "tlevel" obtained in the step S130 is 0. When the result of the judgment is "Yes", that is, the value "tlevel" is 0, the image processing proceeds to the step S165 to substitute 0 for the value B. Then, the image processing proceeds to the step S170. When the result of the judgment is "No", that is, the value "tlevel" is not 0, the image processing proceeds to the step S167 to search the value B from the LUTB (B=LUTB[ADR−1+t]). Then, the image processing proceeds to the step S170.

In the step S170, it is judged whether the switch "t" is 1. When the result of the judgment is "Yes", that is, the switch "t" is 1, the image processing proceeds to the step S175. Then, the value (LOW) which is the lowest of the values A and B, is regarded as the value "A" extracted from the LUTA to calculate the distance DY between the points A and B (DY=B−A). When the result of the judgment is "No", that is, the switch "t" is not 1, the image processing proceeds to the step S177. The above-described LOW is regarded as the value "B" extracted from the LUTB to calculate the distance DY between the points A and B (DY=A−B).

In the step S180, the interpolating operation is carried out to obtain the image signal "Out". The above Equation 8 can be transformed to the following Equation 11.

$$\text{Out}=(\alpha\times A+\beta\times B)/DX \quad \text{Equation 11}$$

Figure 18:
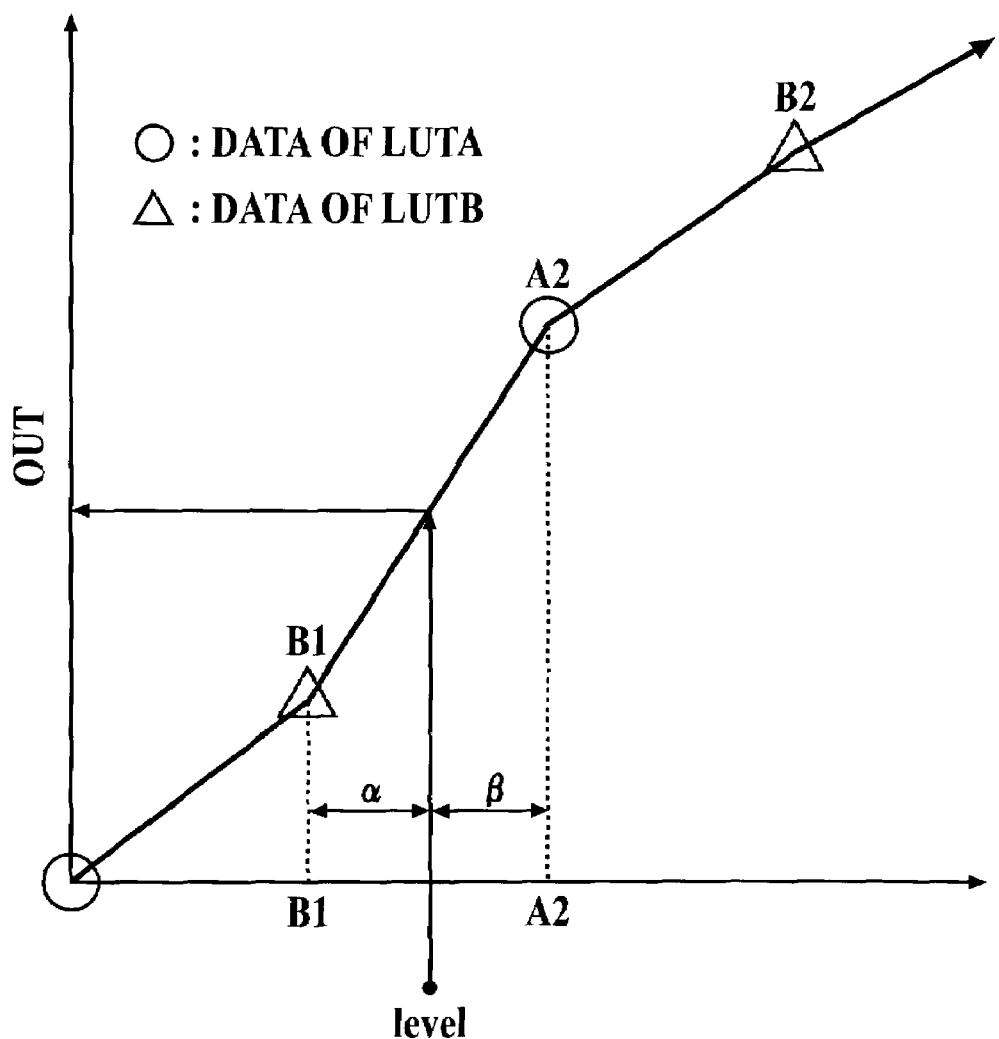
FIG. 18 is a view for explaining the interpolating operation which is carried out in the second embodiment.

FIG. 18 is a view for explaining the the interpolating operation in case that the switch "t" is not 1. When the output value "Out" of the image signal "level" is inserted between the output value B1 from the LUTB and the output value A2 from the LUTA, the image signal "Out" can be calculated by the weighting calculation (parameters α and β) using the two points B1 and A2 between which the image signal "level" is inserted as an input value. In the two values between which the input value is inserted, one is the even-numbered value and the other is the odd-numbered value, necessarily. As described above, in the upper 4 bits of the image signal "level", the even-numbered data is inputted into the LUTA and the odd-numbered data is inputted into the LUTB.

In this figure, the case that the value LOW is the value (B1) outputted from the LUTB is shown. The case that the value LOW is the value outputted from the LUTA is similar to the above case. These two cases are exchanged for each other by the switch "t". Further, the parameters α and β are exchanged.

That is, in case that the switch "t" is not 1, the parameter α is s and the parameter β is DX−s. Further, the value A is LUTA[ADR] and the value B is LUTB[ADR−1]. In this case, the value LOW is B.

On the other hand, in case that the switch "t" is 1, the parameter α is DX−s and the parameter β is s. Further, the value A is LUTA[ADR] and the value B is LUTB[ADR]. In this case, the value LOW is A.

Therefore, Equation 11 is transformed to the following Equation 12.

$$\text{Out}=\text{LOW}+s\times DY/DX \quad \text{Equation 12}$$

In the step S190, the image signal "Out" obtained in the step S180 is outputted as a multilevel signal. The interpolating operation is ended.

In the step S195, like the first embodiment, the dot shift signal is generated by the pattern matching in accordance with the image signal "Out" as a multilevel data outputted in the step S190. In the step S200, in accordance with the multilevel data and the dot shift signal, a pulse signal for the image forming is generated.

That is, in the image processing device shown in FIG. 14, the data M and N relating to the threshold matrix and the shift parameter a relating to the image signal "level" are transmitted from the multilevel parameter generating section 120 to the address calculating circuit 110 in accordance with the dither method. The representing points and the representing values V to be stored in each LUT are transmitted from the multilevel parameter generating section 120 to the LUTA 130 and the LUTB 140 so as to correlate the representing points with the representing values. The transmitted data are stored in the LUTA 130 and the LUTB 140. In case that the image to be processed is a color one, the data comprising the representing points and the representing values V for each color are transmitted to each LUT.

The address calculating circuit 110 calculates the element "e" from the data M and N, the shift parameter α and the data relating the image position (i, j) in accordance with the Equations 5 and 6. In the concrete, the element "e" is calculated by using the image clock of the inputted image signal "level" and H-valid signal in accordance with Equation 7 (step S120). Further, in accordance with Equation 9, the value "tlevel", the switch "t" and the interpolation coefficient "s" are fetched from the image signal "level" (step S130) to transmit these data to the interpolating circuit 150. Further, the address data ADR is calculated by using the element "e" and the value "tlevel" in accordance with Equation 10 (step S140) to transmit the address data ADR to the LUTA 130 and transmit the address data [ADR−1+t] to the LUTB 140 as an input address.

The LUTA 130 transmits the output value A to the interpolating circuit 150 by extracting the predetermined output value A which is previously transmitted from the multilevel parameter generating section 120, from the LUT in accordance with the address data ADR transmitted from the address calculating circuit 110.

The LUTB 140 transmits the output value B to the interpolating circuit 150 by extracting the predetermined output value B (in case of tlevel=0, the output value B is 0.) which is previously transmitted from the multilevel parameter generating section 120, from the LUT in accordance with the value "tlevel" and the address data [ADR−1+t] transmitted from the address calculating circuit 110.

The interpolating circuit 150 calculates the image signal "Out" in accordance with Equation 11 from the value "tlevel", the switch "t" and the interpolation coefficient "s" which are transmitted from the address calculating circuit 110, the output value A outputted from the LUTA 130 and the output value B outputted from the LUTB 140. In the concrete, as described below, the value LOW and the value DY are calculated. Then, the image signal "Out" is calculated in accordance with Equation 12 to transmit the image signal "Out" to the delaying section 160 and the adjacent pixel comparing section 180.

In case of t=0:

$LOW=B$ $DY=A-B$

In case of t=1:

$LOW=A$ $DY=B-A$

The delaying section 160 delays the multilevel signal by the processing time which elapses in the adjacent pixel comparing section 180 so as to output the multilevel signal in exact timing with the dot shift signal outputted from the adjacent pixel comparing section 180. Thereby, the multilevel signal and the dot shift signal corresponding to the multilevel signal are supplied to the pulse generating section 190 simultaneously without time difference.

The adjacent pixel comparing section 180 stores the multilevel signals for a plurality of pixels which are adjacent to the specified pixel. Further, the adjacent pixel comparing section 180 compares the values of the multilevel signals between the adjacent pixels to generate the dot shift signal to be used in the pulse generating section 190, in accordance with the comparing result (step S195).

The method for setting the dot shift signal is the same as that of the first embodiment.

As shown in FIG. 14, the obtained dot shift signal SX is transmitted to the pulse generating section 190.

Like the first embodiment, the pulse generating section 190 generates a pulse signal for the image forming in accordance with the image signal "Out" which is the multilevel signal transmitted from the delaying section 160 and the dot shift signal SX transmitted from the adjacent pixel comparing section 180 (step S200).

The image forming section 200 carries out the image forming in accordance with the pulse transmitted from the pulse generating section 190, for example, carries out the development of the image by the electrophotographic process or the like.

As explained above, in the second embodiment, for example, in the 8-bit input signal value, the information stored in the upper 4 bits is used as an image signal. The information stored in the lower 4 bits is used in the interpolating operation. Therefore, it is possible to obtain a large dither matrix size with a small memory capacity.

In the interpolating operation, in order not to slow the speed of the operating process, it is required to read out two values from the LUT simultaneously in accordance with the image signal, that is, to read out two value by one pixel clock. In consideration of the memory (LUT) access, by storing the information of the lower 4 bits in two independent LUTs (the data to be stored in each LUT are different from each other.) so as to divide the information and by referring to two LUTs, it is possible to read out two values by one pixel clock. Therefore, it is possible to provide the gate array for the image processing method without increasing the memory capacity, that is, to implement it in the hardware.

Further, an image recording method which is suitable for an LED array type of or a laser type of printer in the PWM process, is provided by carrying out the dot shift process for the signal for which the multilevel process has been finished, in accordance with the pattern matching.

The present invention which is applied to a facsimile device or the like, is not limited to the above-described embodiment. It is possible to modify the device or the method variously as long as the modification does not depart from the object, the function and the effect of the present invention.

According to the image processing device and the image processing method of the present invention, the scale of the circuit is suppressed and the gradation and the like of the image can be sufficiently reproduced.

The entire disclosure of Japanese Patent Applications No. Tokugan 2002-35192 filed on Feb. 13, 2002 and No. Tokugan 2002-68499 filed on Mar. 13, 2002 including specification, claims drawings and summary are incorporated herein by reference in its entirety.

What is claimed is:

1. An image processing device for processing an input image so as to reproduce a halftone, comprising:
    a matrix setting section for setting a threshold matrix having a plurality of elements arranged in M columns×N rows, at least two threshold values being stored in each of the elements;
    an element specifying section for specifying an element of the threshold matrix that corresponds to a position of a pixel in the input image; and
    a multilevel signal generating section for fetching the threshold values from the specified element and for generating a multilevel signal by transforming an input pixel value of the pixel to one of multiple levels in accordance with the fetched threshold values;
    wherein the multilevel signal generating section: (i) outputs a constant value Doutmin as the multilevel signal when a first condition, that the input pixel value is smaller than or not larger than a minimum value of the threshold values, is satisfied; (ii) outputs a constant value Doutmax as the multilevel signal when a second condition, that the input pixel value is larger than or not smaller than a maximum value of the threshold values, is satisfied; and (iii) outputs an interpolation value that is between the two constant values Doutmin and Doutmax as the multilevel signal by carrying out a predetermined operation when both the first condition and the second condition are not satisfied.

2. The image processing device of claim 1, wherein the predetermined operation is a linear interpolating operation using the threshold values.

3. The image processing device of claim 1, wherein the threshold values are two threshold values UL(e) and LL(e) and the predetermined operation is a linear interpolating operation expressed by the equation:
$DoutH=Doutmin+[Din-LL(e)]\times(Doutmax-Doutmin)/[UL(e)-LL(e)]$
    where:
        DoutH is the interpolation value;
        UL(e) is the maximum value of the threshold values;
        LL(e) is the minimum value of the threshold values; and
        Din is the input pixel value.

4. The image processing device of claim 1, wherein the multilevel signal generating section generates the multilevel signal taking one level from desired number of multiple levels.

5. The image processing device of claim 1, wherein the multilevel signal generating section outputs a value between the two constant values Doutmin and Doutmax to transform the input pixel value to one of the multiple levels.

6. The image processing device of claim 1, further comprising:
    a dot shift signal generating section for generating a dot shift signal in accordance with the multilevel signal by carrying out a pattern matching process; and
    a pulse signal generating section for generating a pulse signal in accordance with the multilevel signal and the dot shift signal.

7. An image processing method for processing an input image so as to reproduce a halftone, comprising:
    setting a threshold matrix having a plurality of elements arranged in M columns×N rows, at least two threshold values being stored in each of the elements;
    specifying an element of the threshold matrix corresponding to a position of a pixel in the input image; and
    fetching the threshold values from the specified element and generating a multilevel signal by transforming an input pixel value of the pixel to one of multiple levels in accordance with the fetched threshold values;
    wherein in the generating of the multilevel signal: (i) a constant value Doutmin is outputted as the multilevel signal when a first condition, that the input pixel value is smaller than or not larger than a minimum value of the threshold values, is satisfied; (ii) a constant value Doutmax is outputted as the multilevel signal when a second condition, that the input pixel value is larger than or not smaller than a maximum value of the threshold values, is satisfied; and (iii) an interpolation value between the two constant values Doutmin and Doutmax is outputted as the multilevel signal by carrying out a predetermined operation when both the first condition and the second condition are not satisfied.

8. The image processing method of claim 7, wherein the predetermined operation is a linear interpolating operation using the threshold values.

9. The image processing method of claim 7, wherein the threshold values are two threshold values UL(e) and LL(e) and the predetermined operation is a linear interpolating operation expressed by the equation:
$DoutH=Doutmin+[Din-LL(e)]\times(Doutmax-Doutmin)/[UL(e)-LL(e)]$
    where:
        DoutH is the interpolation value;
        UL(e) is the maximum value of the threshold values;
        LL(e) is the minimum value of the threshold values; and
        Din is the input pixel value.

10. The image processing method of claim 7, wherein in the generating of the multilevel signal, the multilevel signal taking one level from desired number of multiple levels is generated.

11. The image processing method of claim 7, wherein in the generating of the multilevel signal, a value between the two constant values Doutmin and Doutmax is outputted to transform the input pixel value to one of the multiple levels.

12. The image processing method of claim 7, further comprising:
    generating a dot shift signal in accordance with the multilevel signal by carrying out a pattern matching process; and
    generating a pulse signal in accordance with the multilevel signal and the dot shift signal.

* * * * *